(12) United States Patent
Frick et al.

(10) Patent No.: US 9,965,011 B2
(45) Date of Patent: May 8, 2018

(54) CONTROLLER INTERFACE FOR OPERATION OF MULTIPLE STORAGE DRIVES

(71) Applicant: Seagate Technology LLC, Cupertino, CA (US)

(72) Inventors: Guy David Frick, Lafayette, CO (US); Robert Dixon, Longmont, CO (US); Jerry D. Dallmann, Westminster, CO (US); Anthony Pronozuk, Loveland, CO (US); James Dykes, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 138 days.

(21) Appl. No.: 14/726,146

(22) Filed: May 29, 2015

(65) Prior Publication Data

US 2015/0363109 A1  Dec. 17, 2015

Related U.S. Application Data

(60) Provisional application No. 62/012,205, filed on Jun. 13, 2014, provisional application No. 62/012,219, filed on Jun. 13, 2014.

(51) Int. Cl.
*G06F 1/28* (2006.01)
*G06F 1/32* (2006.01)
(Continued)

(52) U.S. Cl.
CPC .............. *G06F 1/28* (2013.01); *G06F 1/3203* (2013.01); *G06F 1/3221* (2013.01);
(Continued)

(58) Field of Classification Search
CPC ........ G06F 1/28; G06F 1/3208; G06F 1/3221; G06F 1/3287; G06F 3/0604;
(Continued)

(56) References Cited

U.S. PATENT DOCUMENTS 5,504,882 A    4/1996  Chai et al.
5,678,023 A *  10/1997 Adams ................. G06F 3/0601
                                                711/102

(Continued)

FOREIGN PATENT DOCUMENTS

WO       2014-065841 A1    5/2014

OTHER PUBLICATIONS

Caulfield, et al., "Moneta: A High-performance Storage Array Architecture for Next-generation, Non-volatile Memories," Dept. of Computer Science & Engineering, U.C. San Diego, California, 2010, 11 pages.

(Continued)

*Primary Examiner* — Reginald G Bragdon
*Assistant Examiner* — Aaron D Ho
(74) *Attorney, Agent, or Firm* — Holzer Patel Drennan

(57) ABSTRACT

A mass data storage system includes a number of communicatively coupled storage drives powered by one or more power supplies. Shared control electronics selectively connect power and a data signal to a select storage drive via instructions within a control signal received by the common controller. Instructions for selectively powering and connecting the data signal are transmitted over a first signal path to a first controller of the shared electronics. Responsive to successful execution of the instructions, a drive access command is sent over a second different signal path to a second controller of the shared electronics.

20 Claims, 5 Drawing Sheets

(51) Int. Cl.
  *G06F 3/06* (2006.01)
  *G06F 11/20* (2006.01)

(52) U.S. Cl.
  CPC .......... *G06F 1/3287* (2013.01); *G06F 3/0604* (2013.01); *G06F 3/0619* (2013.01); *G06F 3/0625* (2013.01); *G06F 3/0634* (2013.01); *G06F 3/0635* (2013.01); *G06F 3/0658* (2013.01); *G06F 3/0659* (2013.01); *G06F 3/0665* (2013.01); *G06F 3/0685* (2013.01); *G06F 3/0689* (2013.01); *G06F 11/2015* (2013.01); *G06F 11/2094* (2013.01); *G06F 2201/805* (2013.01); *Y02B 60/1246* (2013.01); *Y02D 10/154* (2018.01)

(58) Field of Classification Search
  CPC .... G06F 3/0619; G06F 3/0625; G06F 3/0634; G06F 3/0635; G06F 3/0658; G06F 3/0659; G06F 3/0665; G06F 3/0685; G06F 3/0689; G06F 11/2015; G06F 11/2094; G06F 2201/805
  USPC ........................................................ 711/112
  See application file for complete search history.

(56) References Cited

U.S. PATENT DOCUMENTS

| | | |
|---|---|---|
| 5,778,374 A | 7/1998 | Dang et al. |
| 6,332,139 B1 | 12/2001 | Kaneko et al. |
| 6,560,155 B1 | 5/2003 | Hush |
| 6,766,420 B2 | 7/2004 | Rawson, III |
| 6,959,399 B2 | 10/2005 | King et al. |
| 6,986,075 B2 | 1/2006 | Ackaret et al. |
| 7,124,272 B1 | 10/2006 | Kennedy et al. |
| 7,210,005 B2 | 4/2007 | Guha et al. |
| 7,237,129 B2 | 6/2007 | Fung |
| 7,318,164 B2 | 1/2008 | Rawson, III |
| 7,334,140 B2 | 2/2008 | Jones et al. |
| 7,434,090 B2 | 10/2008 | Hartung et al. |
| 7,443,759 B1 | 10/2008 | Rowlands et al. |
| 7,516,348 B1 | 4/2009 | Ofer |
| 7,568,122 B2 | 7/2009 | Mechalke et al. |
| 7,673,167 B2 | 3/2010 | Elliott et al. |
| 7,699,023 B2 | 4/2010 | Chen et al. |
| 7,702,853 B2 | 4/2010 | Hetzler et al. |
| 7,859,834 B2 | 12/2010 | Fukuda et al. |
| 8,024,602 B2 | 9/2011 | DeCenzo et al. |
| 8,127,165 B2 | 2/2012 | Qi et al. |
| 8,161,317 B2 * | 4/2012 | Ishii ...................... G06F 11/008 714/42 |
| 8,412,986 B2 | 4/2013 | Ishii et al. |
| 8,473,779 B2 | 6/2013 | Siewert et al. |
| 8,495,276 B2 | 7/2013 | Han et al. |
| 8,522,058 B2 | 8/2013 | Chang et al. |
| 8,583,838 B1 | 11/2013 | Marshak et al. |
| 8,947,816 B1 | 2/2015 | Ryan et al. |
| 2005/0228943 A1* | 10/2005 | DeCenzo ............ G06F 11/1076 711/114 |
| 2006/0004868 A1 | 1/2006 | Claudatos et al. |
| 2006/0062383 A1 | 3/2006 | Kaneda et al. |
| 2007/0220316 A1 | 9/2007 | Guha et al. |
| 2008/0276033 A1* | 11/2008 | DeCenzo ............ G06F 11/1076 710/316 |
| 2009/0089504 A1 | 4/2009 | Soran et al. |
| 2009/0150593 A1 | 6/2009 | Hamilton et al. |
| 2009/0249003 A1 | 10/2009 | Bates et al. |
| 2010/0011229 A1 | 1/2010 | Davis et al. |
| 2010/0138677 A1 | 6/2010 | Pagan et al. |
| 2011/0239013 A1 | 9/2011 | Muller |
| 2012/0210169 A1 | 8/2012 | Coile et al. |
| 2012/0233484 A1 | 9/2012 | Rossi |
| 2012/0272038 A1 | 10/2012 | Wei et al. |
| 2012/0297114 A1 | 11/2012 | Koizumi et al. |
| 2013/0304963 A1 | 11/2013 | Luo et al. |
| 2014/0281194 A1 | 9/2014 | Gaertner et al. |
| 2014/0297700 A1 | 10/2014 | Vongsouvanh |
| 2015/0026488 A1* | 1/2015 | El-Batal ................ G06F 3/0625 713/300 |
| 2015/0197330 A1 | 7/2015 | Mayer et al. |
| 2015/0331476 A1* | 11/2015 | Slik .......................... G06F 1/28 713/324 |
| 2015/0331632 A1* | 11/2015 | Slik .......................... G06F 9/54 711/154 |
| 2015/0362968 A1 | 12/2015 | Jurey et al. |
| 2015/0362972 A1 | 12/2015 | Frick |
| 2015/0362983 A1 | 12/2015 | Frick |
| 2015/0363126 A1 | 12/2015 | Frick |
| 2015/0363127 A1 | 12/2015 | Frick |
| 2015/0363288 A1 | 12/2015 | Frick |

OTHER PUBLICATIONS

Delaluz, et al., "Memory Energy Management Using Software and Hardware Directed Power Mode Control," Dept. of Computer Science & Engineering, Pennsylvania State University, Pennsylvania, 2001, 21 pages.

Deng, et al., "Architectures and Optimization Methods of Flash Memory Based Storage Systems," Journal of Systems Architecture 57, Department of Computer Science, Jinan University, China, 2011, 14 pages.

Dittia, et al, "The APIC Approach to High Performance Network Interface Design: Protected DMA and Other Techniques," Dept. of Computer Science, Washington University, St. Louis, MO, 1997, 24 pages.

Gibson, et al., "A Case for Network-Attached Secure Disks," School of Computer Science Carnegie Mellon University, Pittsburgh, PA, Sep. 1996, 19 pages.

Jin, et al., "High-speed Data Channel in the Disk Array System," Broadband European Networks and Multimedia Services 580, Sep. 1998, 2 pages.

Katz, Randy H., "High Performance Network and Channel-Based Storage," Computer Science Division, Dept. of EE and Computer Sciences, U.C Berkeley, CA, Sep. 1991, 41 Pages.

Kottke, Thomas, "An Economical Data Acquisition System for Measuring and Recording Multiple Channels of Information at High Rates," Army Research Laboratory, National Technical Information Service, U.S. Dept. of Commerce, Springfield, VA, Sep. 1995, 79 pages.

Kumon, Kouichi, "Overview of Next-Generation Green Data Center," Fujitsu Sci. Tech, vol. 48, No. 2, Apr. 2012, 7 pages.

Riedel, Erik, "Active Disks—Remote Execution for Network-Attached Storage," Dissertation, School of Computer Science Carnegie Mellon University, Pittsburgh, PA, Nov. 1999, 203 pages.

Tudor, et al., "On Understanding the Energy Consumption of ARM-based Multicore Servers," Sigmetrics, Dept. of Computer Science, National University of Singapore, 2013, 12 pages.

Vekiarides, Nicos, "Fault-Tolerant Disk Storage and File Systems Using Reflective Memory," Dept. of Electrical & Computer Engineering, Carnegie Mellon University, Pittsburgh, Pennsylvania, 1995, 11 pages.

Yousif, Mazin, "Shared-storage Clusters," Cluster Computing Journal abstract, vol. 2, Issue 4, North Carolina, Dec. 1999, 6 pages.

Author Unknown, "Adaptive Memory Technology in Solid State Hybrid Drives," Seatage, retrieved on Apr. 1, 2015, 3 pages, retrieved from http://www.seagate.com/tech-insights/adaptive-memory-in-sshd-master-ti/.

Author Unknown, "DX100," Quamtum, retrieved on May 13, 2015, 1 page, retrieved from:http://www.quantum.com/serviceandsupport/softwareanddocumentationdownloads/dx100/index.aspx.

* cited by examiner

CONTROLLER INTERFACE FOR OPERATION OF MULTIPLE STORAGE DRIVES

CROSS-REFERENCE TO RELATED APPLICATIONS

The present application claims benefit of priority to U.S. Provisional Patent Application No. 62/012,205 entitled "Off-line/On-line Mass Data Storage Management" and filed on Jun. 13, 2014, and also claims benefit of priority to U.S. Provisional Patent Application No. 62/012,219 entitled "Off-line/On-line Mass Data Storage System" and filed on Jun. 13, 2014. Both of these applications are specifically incorporated by reference for all that they disclose or teach.

SUMMARY

Implementations disclosed herein provide for a system with multiple selectable storage drives in an enclosure communicatively coupled to shared control electronics including a first controller and a second controller. The first controller selects a storage drive of the multiple selectable storage drives for execution of a drive access command and the second controller executes a drive access command on the selected storage drive. The system further includes a first signal path that facilitates transmission of a drive selection instruction to the first controller and a second signal path that facilitates transmission of the drive access command to the second controller.

Implementations disclosed herein further provide a method for selectively reading or writing data to one of multiple selectable storage drives with shared control electronics. The method comprises receiving, along a first signal path and at a first controller, a drive selection instruction to select a first storage drive for a drive access operation from the multiple selectable storage drives. Responsive to receipt of the drive selection instruction, the shared control electronics are reconfigured to disable read/write access of a second storage drive and enable read/write access of the first storage drive. Responsive to the reconfiguring of the shared electronics, a drive access command is received at a second controller over a second signal path different from the first signal path. The drive access command is executed on the first storage drive.

Implementations disclosed herein still further provide for a mass data storage system comprising a processor and a drive selection instruction stored in memory and executable by the processor. The drive selection instruction includes a first identifier for selecting one of multiple selectable enclosures that each further include multiple selectable storage drives coupled to shared control electronics; a second identifier for selecting one of the selectable storage drives in the selected enclosure; and a drive control command for executing on the selected storage drive in the selected enclosure.

This Summary is provided to introduce a selection of concepts in a simplified form that are further described below in the Detailed Description. This Summary is not intended to identify key features or essential features of the claimed subject matter, nor is it intended to limit the scope of the claimed subject matter. These and various other features and advantages will be apparent from a reading of the following Detailed Description.

DETAILED DESCRIPTION

Figure 1:
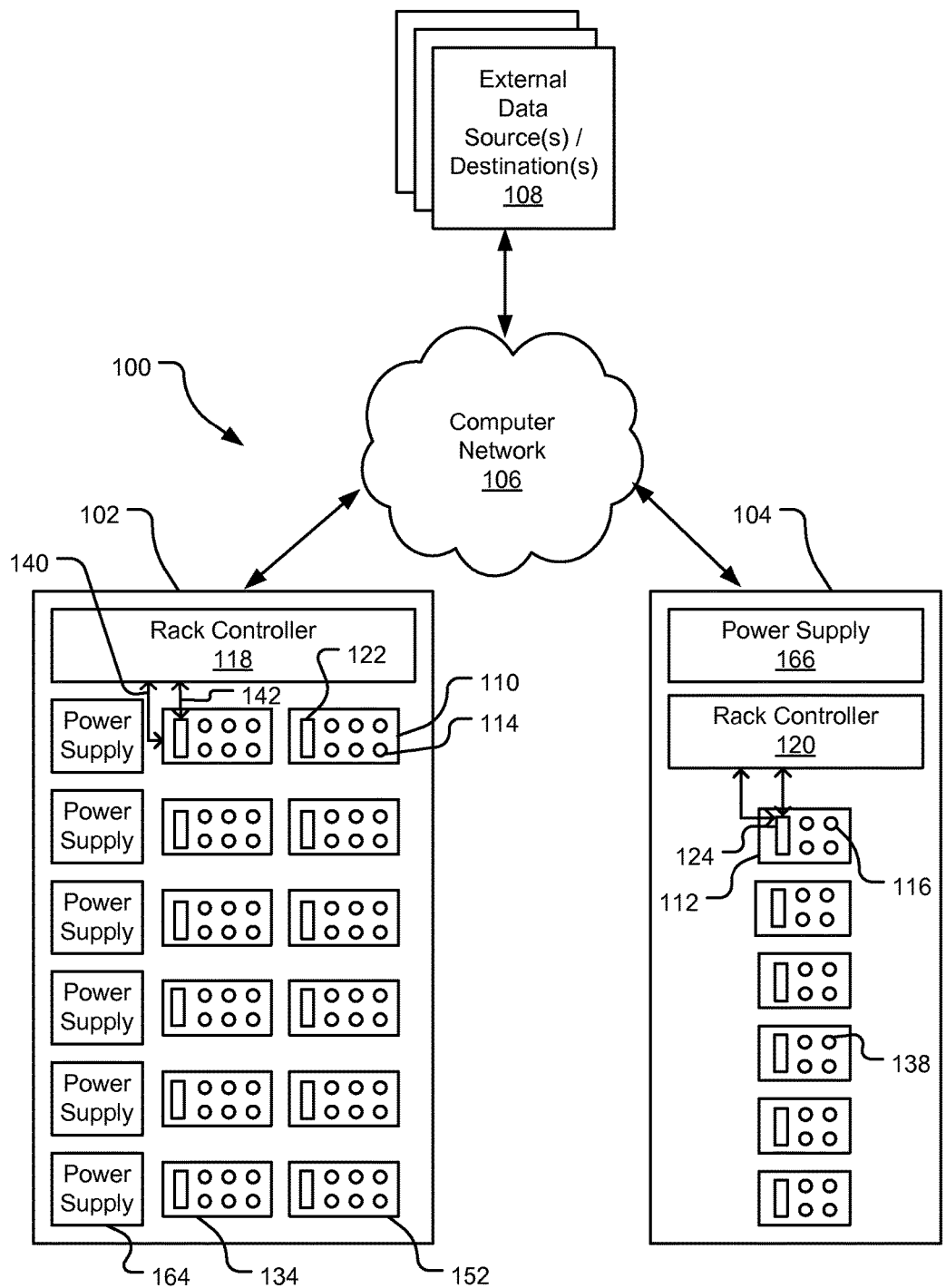
FIG. 1 illustrates an example mass data storage system with multiple media unit controllers, each operating multiple storage drives.

Efficient use of power is an important aspect of running data storage devices, especially in embodiments such as a data center environment designed to serve as a public or private cloud storage system. On-line mass data storage (sometimes referred to as secondary or cloud storage) refers to one or more interconnected data storage units that are actively running and available for data access operations (i.e., read and/or write operations). Example on-line mass data storage units include hard disk drives ("HDDs"), optical drives, solid state drives ("SSDs"), and flash memory. Typically, time to data ("TTD") for on-line mass data storage units is less than 2 milliseconds. On-line mass data storage benefits from very high TTD capabilities, but is expensive to build and operate. More specifically, individual on-line mass data storage units are typically of a relatively high quality, driving build costs up. The individual on-line mass data storage units also consume significant power in an on-line state, driving operating costs up.

Near-line (or near on-line) mass data storage refers to one or more interconnected data storage units that are powered on, but kept a low power consumption state when not in use and brought to an on-line state before running data access operations. Hard disk, optical, and/or flash memory drives may be used for near-line storage, with an additional mechanism to bring a selected storage unit to an on-line state for data access operations. Such example mechanisms are robotic near-line storage (i.e., the system is aware of where a desired data chunk resides on a physical volume and utilizes a robotic mechanism to retrieve the physical volume for data access operations) and HDD near-line storage (e.g., a massive array of idle discs ("MAID")). MAID systems archive data in an array of HDDs that are operating in a standby power state, most of which are not spinning. The MAID system spins up each HDD on demand when desired to perform data access operations on a disc within that drive. Typically, TTD for MAID-type near-line mass data storage units is less than 4 milliseconds. Near-line mass data storage systems have lower operating costs than on-line mass data storage systems due to the reduced power demand, but may have similar build costs.

Off-line (or cold) mass data storage refers to one or more interconnected data storage units that are kept in a power off state and/or utilize remotely located storage media to store data. Typically, off-line mass data storage utilizes one or more interconnected tape drives, each with numerous tapes associated with the drive. As discussed above with regard to robotic near-line storage, a desired tape is retrieved from its storage location and loaded into its associated drive for data access operations. In off-line tape mass data storage units, the desired tape is often manually retrieved and loaded. As a result, TTD for off-line tape mass data storage units can be greater than 24 hours. While the build and operating costs of off-line tape mass data storage are low, some applications require a faster access time than 24 hours, but not as fast as on-line or near-line mass data storage systems.

The disclosed off-line HDD mass data storage systems can achieve TTD much faster than that of off-line tape mass data storage while maintaining build and operating costs competitive with off-line tape mass data storage. This is accomplished, in part, with a common controller operating multiple storage resources via an array of switches within a mass data storage system.

FIG. 1 illustrates an example mass data storage system 100 with multiple media unit controllers (e.g., media unit controllers or zone boards 122, 124); each media unit controller operating multiple storage resources (e.g., storage drives 114, 116, 138) within the system 100. The storage system 100 (e.g., a server cluster or farm) includes a number of storage racks (e.g., storage racks 102, 104) oriented in adjacent or separate physical locations or facilities (e.g., data rooms or centers). In some implementations, a first quantity of storage racks is located in a first server facility, a second quantity of storage racks is located in a second server facility, and so on. The server facilities may be separated by any distance (e.g., several feet or many miles). The storage system 100 may accommodate any number of storage racks and each rack is located in one of any number of server facilities. The storage system 100 may accommodate any use of mass data storage (e.g., content delivery, backup, archiving, etc.).

The individual storage racks are interconnected to one another via a computer network 106 (e.g., an Ethernet or a custom interconnect network). Further, the interconnected storage racks may be connected to one or more external data source(s) and/or destination(s) 108 via the same computer network 106 or an additional interconnected network (e.g., a local area network ("LAN") or a wide area network ("WAN"), not shown). Communication between the storage racks 102, 104, computer network 106, and the external data source(s) and/or destination(s) 108 may occur using a variety of communication protocols (e.g., transmission control protocol/internet protocol ("TCP/IP"), packet over synchronous optical networking/synchronous digital hierarchy ("SONET/SDH"), multiprotocol label switching ("MPLS"), asynchronous transfer mode ("ATM"), Ethernet, and frame relay). As a result, data may be accessed and moved between the individual storage racks and the external data source(s) and/or destination(s) 108 as desired.

Each individual storage rack includes an array of storage media units (also referred to as physical zones), each of which is selectively powered by one or more power supplies and controlled by a rack controller (alternatively referred to as a "storage rack server," a "storage system server," or an "expander"). For example, storage rack 102 includes 12 individual storage media units (e.g., storage media unit 110) and 6 individual power supplies (e.g., power supply 164), all of which are controlled by rack controller 118. Storage rack 104 includes 6 individual storage media units (e.g., storage media unit 112) and 1 power supply 166 controlled by rack controller 120. In some implementations, individual storage racks may include greater or fewer individual storage media units than the depicted 12 and 6 storage media units per storage rack and/or greater or fewer individual power supplies than the depicted 6 and 1 power supplies per storage rack. In other implementations, some racks may not include a rack controller at all. In such implementations, some or all of the functionality of the rack controller is moved to a rack controller in another rack and/or individual media unit controllers within the same rack. As a result, an individual rack controller may control multiple racks.

Each media unit within a storage rack includes an array of individual storage drives controlled by a media unit controller. For example, the media unit 110 includes 6 individual storage drives (e.g., the storage drive 114) controlled by the media unit controller (or zone board) 122. The media unit 112 includes 4 individual storage drives (e.g., the storage drive 116) controlled by the media unit controller 124. In other implementations, individual storage media units may include greater or fewer storage drives than the depicted 6 and 4 storage drives per media unit.

The power supplies may power multiple media units or a single media unit. For example, each power supply in storage rack 102 powers a pair of media units (e.g., power supply 164 powers media units 134, 152). Power supply 166 powers all 6 media units in storage rack 104. An upper end power capability of each individual power supply may determine how many storage drives may be operated simultaneously by that power supply, which may range from a single storage drive to multiple storage drives operating across the same or different media units. In still other implementations, an individual power supply may power multiple racks.

In some implementations, physical collections of media units and/or power supplies are selectively installed and uninstalled from a storage rack (e.g., configured as a blade, which corresponds to the storage rack physical configuration). In an example standard server-rack configuration, the individual storage racks are each subdivided into individual rack units (e.g., 42 rack units), where a pair of media units and one power supply are physically dimensioned to fill one rack unit (i.e., 19 inches wide by 1.75 inches tall). Each such storage rack can therefore accommodate a total of 84 media units and 42 power supplies. In other implementations, the storage rack and rack units are physically dimensioned to accommodate any desired number of media units and/or power supplies.

In one implementation, each storage drive is a distinct storage medium or set of storage media with a portion of the read/write control functionality of the storage drive removed to a corresponding media unit controller and/or rack controller of the mass data storage system 100. As a result, one or both of the media unit controller and/or the rack controller can selectively power (e.g., power-on, power-off, spin-up, spin-down, etc.) an individual storage drive as desired to read data from and/or write data to the storage drive without having to supply power to all storage drives within the system 100 continuously. As used herein, the term "off state" refers to a state where no power is supplied to a storage drive and "on state" refers to any state where power is supplied to the storage drive. One example selective powering operation powers a storage resource from an off state to an on state. In the on state, the storage drive can perform normal data transfer operations (e.g., read and write operations).

Some read/write control functionality of the storage drives may be retained within the storage drives and thus not removed to the corresponding media unit controller or rack controller of the mass storage system 100. Such storage drives may retain self-powering resources and have the ability to effectuate a "power on" or "power off" mode change in response to communication from a rack controller or a media unit controller.

Some of the control hardware and software for each individual storage drive is removed to a corresponding media unit controller and/or rack controller, thereby centralizing control functions of the individual storage drives to a media unit level and/or a rack level. By moving some or all of the storage drive control hardware and software into the corresponding media unit controller and/or rack controller, the individual storage drives may have disparate characteristics (e.g., storage technology (e.g., magnetic, optical, semi-conducting), performance characteristics and power characteristics). Further, the individual storage drives may utilize any available storage technology (e.g., magnetic storage, optical storage, semiconducting storage (e.g., flash-based solid state)).

Operation of the mass data storage system 100 may then be optimized based on the characteristics of the storage drives available within the system 100. In some implementations, each of the individual storage drives within a media unit has disparate characteristics, but each media unit has the same characteristics (i.e., similar within industry acceptable tolerances). In other implementations, the media units have disparate characteristics as well.

Drives with performance characteristics that meet an operational threshold may be characterized as having the same (or similar) performance characteristics. For example, a 4 terabyte drives have the capability of storing at least 4 terabytes of data and is formatted to store 4 terabytes of data. Drives that meet this threshold are referred to herein as having the same or similar storage capacity. Drives that do not have the capability of storing 4 terabytes of data and/or drives that are formatted to store a different quantity of data are referred to herein as having disparate storage capacity.

Drives with performance characteristics that maintain an operational target may also be characterized as having the same (or similar) performance characteristics. Similarly, a 7200 RPM storage drive may vary rotational speed from 7200 RPM by no more than 1% during data access operations. Drives that meet this operating limitation are referred to herein as having the same or similar rotational speeds. Drives that fail to meet this operating limitation are referred to herein as having disparate rotational speeds. Storage capacity and rotational speed are two example storage drive performance capabilities. Other performance capabilities are contemplated herein (e.g., read speed, write speed, host interface speed, security level (e.g., encoded or not encoded), etc.).

Each of the rack controllers 118, 120 are communicatively coupled to the media unit controllers within corresponding racks 102, 104, respectively, and media unit controllers (e.g., media unit controller 122) are communicatively coupled to an associated nest of storage drives (e.g., storage drive 114). Communication between the rack controllers, the media unit controllers, and the storage drives is accomplished via compute nodes, inter-integrated circuits ("I2C"), serial attached small computer system interface ("SAS"), serial advanced technology attachment ("SATA"), universal serial bus ("USB"), peripheral component interconnect express ("PCIe"), Ethernet, wireless channels, etc.

For example, in response to a read or write command, the mass data storage system 100 uses the detailed mapping of the power network and storage resources within the system 100 to identify available storage locations to receive data (if the command is a write command) or act as a data source (if the command is a read command). Using a number of power constraints and data requirements, the rack controller instructs one or more media units to each connect and power up a storage drive and ready it for read and write operations. The media unit controllers switch power to the selected drive, power on the selected drive, and connect a read/write channel to the selected drive. After execution of the read or write command, the selected drives are returned to an off-line (powered off) state. Storage resources selectively powered for each data transfer operation (e.g., read operation or write operation) may be on the same or different media units and/or storage racks.

Each of the media unit controllers (e.g., the media unit controller 122) is communicatively coupled to the corresponding rack controller (e.g., the rack controller 118) across two different signal paths, such as a drive access path 140 and a control path 142. In one implementation, the rack controller utilizes the control path 142 to select and configure a storage resource for a particular read or write operation while sending all read/write commands across the drive access path 140. Control interfaces for each of the drive access path 140 and control path 142 provide for independent selection, powering, and data accessing to the various storage resources in each of the media units.

Figure 2:
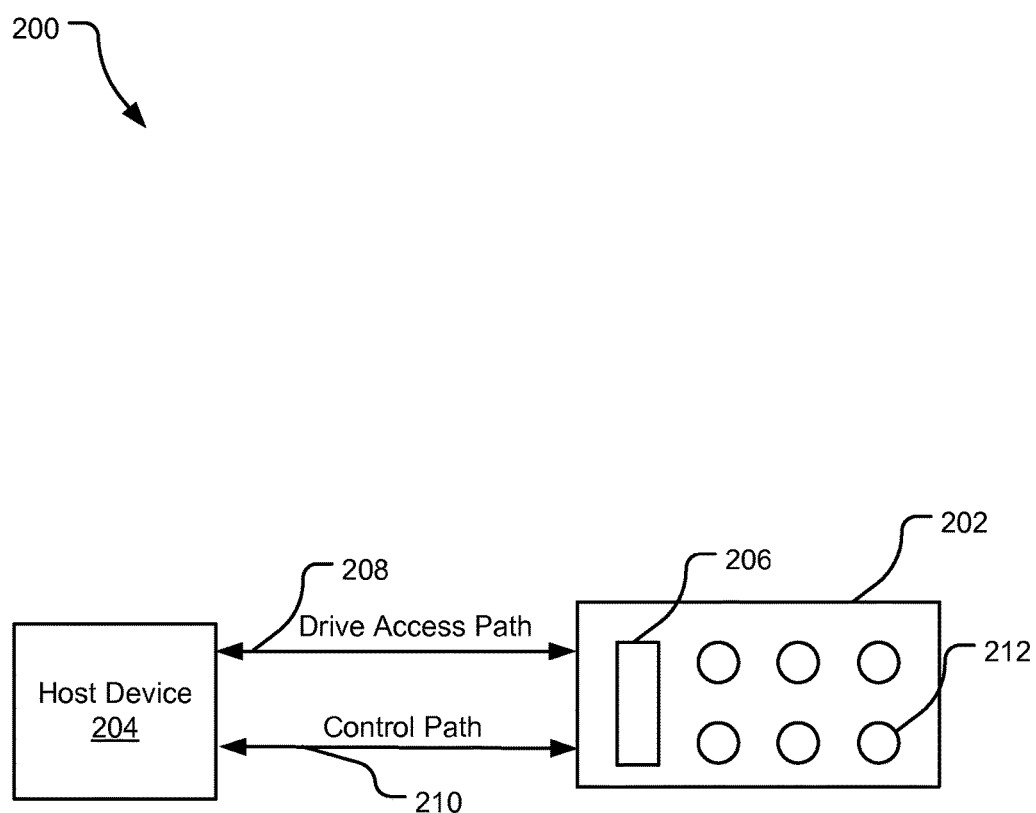
FIG. 2 illustrates an example mass data storage system for independently selecting and powering one or more storage drives with shared control electronics within a media unit.

FIG. 2 illustrates an example data storage system 200 for independently selecting and powering one or more storage drives (e.g., a storage drive 212) within a media unit 202 via a shared controller (e.g., a media unit controller 206). Each of the storage drives in the media unit 202 is communicatively coupled to the media unit controller 206 (e.g., via serial attached SCSI ("SAS") connections, proprietary head interface, etc.). In various implementations, the media unit controller 206 may take the form of one or more printed circuit board assemblies ("PCBAs"), peripheral interface controllers (also referred to as programmable interface controllers, programmable intelligent computers, or "PICs"), application-specific integrated circuits ("ASICs") and/or systems on chips ("SoCs"), for example.

The media unit controller 206 may further be connected to an array of switches (not shown) that communicatively couple the media unit controller 206 to an array of individual storage drives to facilitate selective powering and data access responsive to various commands received from a host device 204.

The host device 204 may represent, for example, a rack controller (e.g., rack controller 118 in FIG. 1) or other processing entity configured to send drive access commands and drive control commands to the media unit controller 206. As used herein, a drive access command refers to a command for accessing or changing content on a storage device, such as a read command, a write command, or an erase command (e.g., in implementations employing solid state storage). In contrast, a drive control command generally refers to a command that is not a drive access command that controls some aspect of drive selection and/or drive operation. For example, a drive control command may be a command for selecting parameters for a preamplifier, checking security credentials, power control (e.g., power on or power off one or more control chips, storage drives, etc.), checking on various configuration or power states of one or more drives within the media unit 202, selecting a specific address access path, checking a temperature within the media unit 202, etc.

Drive control commands may be sent from the host device 204 and/or stored in firmware of the media unit controller 206. For example, a drive control command from the host device 204 may trigger execution of a sequence of drive control commands stored in firmware of the media unit 202. In preparation for execution of a drive access command, the host device 204 transmits a drive selection instruction along the control path 210. The drive selection instruction includes one or more drive control commands that generally configure one or more storage drives for a drive access operation.

For example, a drive selection instruction may include one or more drive control commands for powering on a select storage drive and/or one or more commands to switch electrical connections to allow data to be written to or read from the select storage drive. In one implementation, the media until controller 206 selects a single storage drive at any given time. As used herein a drive is "selected" when it is powered to an "on state" and control electronics are configured to perform a drive access operation on the select drive.

As illustrated in FIG. 2, the host device 204 is communicatively coupled to the media unit 202 via two signal paths: (1) a drive access path 208 and (2) a control path 210. In one implementation, the drive access path 208 facilitates transmission of user data and drive access commands, while the control path 210 facilitates transmission of drive control commands, such as commands to power or select (e.g., switch between) one or more of the storage drives within the media unit 202.

In various implementations, a variety of different communication protocols may be utilized in conjunction with the drive access path 208 and/or the control path 210 including, for example, I2C, SAS, SATA, USB, PCIe, or Ethernet. In one implementation, the drive access path 208 is an industry standard path that facilitates transmission of high-speed signals to a selected storage drive (e.g. HDA) within the media unit 202, such as via a SATA or SAS protocol. In another implementation, the control path 210 facilitates transmission of a lower speed signal, such as via an Inter-Integrated Circuit (I2C) connection from the host device 204.

Communications sent and received along the control path 210 may utilize a communication protocol that sets the operating syntax for a bus in the media unit controller 206 receiving communications along the drive access path 208. For example, the communication protocol of the control path 210 determines what devices appear on the bus coupled to the drive access path 208 and provides an API for the media unit controller 206 to control an interface to the drive access path 208.

According to one example API, each drive control command transmitted by the host device 204 along the control path 210 is transmitted along with a first identifier indicating a target media unit (e.g., the media unit 202) and a second identifier indicating at least one target drive within target media unit (e.g., the storage drive 212). For example, a sequence of data bits received along the control path 210 may include various digits representing: (1) a media unit ID identifying a target media unit (e.g., the media unit 202); (2) a drive ID identifying a target drive (e.g., an index of the drives 1-6 in FIG. 1) within the target media unit; and (3) a trailing series of bits representing a particular drive control command for execution on the target drive.

In one implementation, a number of communicatively coupled media unit controllers (e.g., the media unit controller 206) "listen" to communications across the control path 210. Each media unit controller waits for a sequence of data bits including a self-identifying media unit ID. Upon detecting the self-identifying media unit ID in an incoming sequence of bits, the media unit controller 206 interprets a next series of bits as a storage drive identifier (e.g., the storage drive 212), and a following series of bits as a drive control command, which may initiate execution of a series of firmware commands.

In one example scenario, the host device 204 utilizes the control path 210 to ask the media unit controller 206 to identify a power state of the storage drive 212. The media unit controller 206 returns a binary value indicating that the current power state of the storage drive 212 is "off." In response to receipt of the binary value, the host device 204 transmits a drive selection instruction via the control path 210 to ask the media unit controller 206 to configure the storage drive 212 for a drive access operation. Responsive to receipt of the drive selection instruction, the media unit controller 206 transmits a "select device" command (e.g., a drive selection instruction) via the control path 210. The select device command may trigger execution of further actions encoded in firmware of the media unit controller 206. For example, the select device command may initiate the following sequence of firmware operations: (1) place a controller chip of the media unit controller 206 into a 'hold' state (e.g., a reset mode); (2) disable power to the controller chip; (3) select a preamplifier channel (e.g., to optimize the data channel for a specific data path); (4) select a storage drive assembly within the media unit 202 (e.g., by sending signals to a multiplexor to switch the data and power paths); and (5) release the controller chip from the hold state.

In some implementations, the drive selection instruction includes or triggers further instructions for ensuring compliance with applicable power rules and policies when switching from one device to another. For example, the host device 204 and/or media unit controller 206 may be programmed with rules regulating power consumption, distribution, and usage within the data storage system 200. For example, the media unit controller 206 may run firmware commands to run checks on output from a state machine ensuring that a total number of storage drives powered within the media unit does not exceed a set maximum and/or that not more than a predetermined number of powered storage drives share a common power controller circuit.

After sending a drive selection instruction to the media unit controller 206 via the control path 210, the host device 204 postpones execution of any related drive access commands (e.g., the read or write commands) until receiving confirmation that the target drive is selected and ready for a drive access operation. "Selected" implies, for example, that applicable power rules and policies are complied with, that the target drive is powered on, and that correct switches for the target drive are engaged (e.g., read/write switch, preamp switch, voice coil motor (VCM) switch, spindle switch, etc.).

To verify whether or not the target drive is selected, the host device 204 retrieves power and switch configuration information over either the control path 210 and/or the drive access path 208. For example, the host device 204 may poll the media unit controller 206 over the control path 210 to determine whether one or more drive control commands has successfully executed. The host device 204 may also retrieve other information, such as the drive serial number, through the control path 210 and corresponding interface to the media unit controller 206. In some situations, the host device 204 may also receive feedback over the drive access path 208 in lieu of or in addition to the feedback received via the control path 210. For example, a successfully executed drive selection instruction may re-start an interface connection between the media unit controller 206 and the host device 204 via the drive access path 208. The host device 204 may "see" the restart as an indication that a drive selection instruction was successfully executed.

Responsive to the feedback over the control path 210 and/or the drive access path 208, the host device 204 transmits one or more drive access commands over the drive access path 208, and the media unit controller 206 executes the drive access commands.

Figure 3:
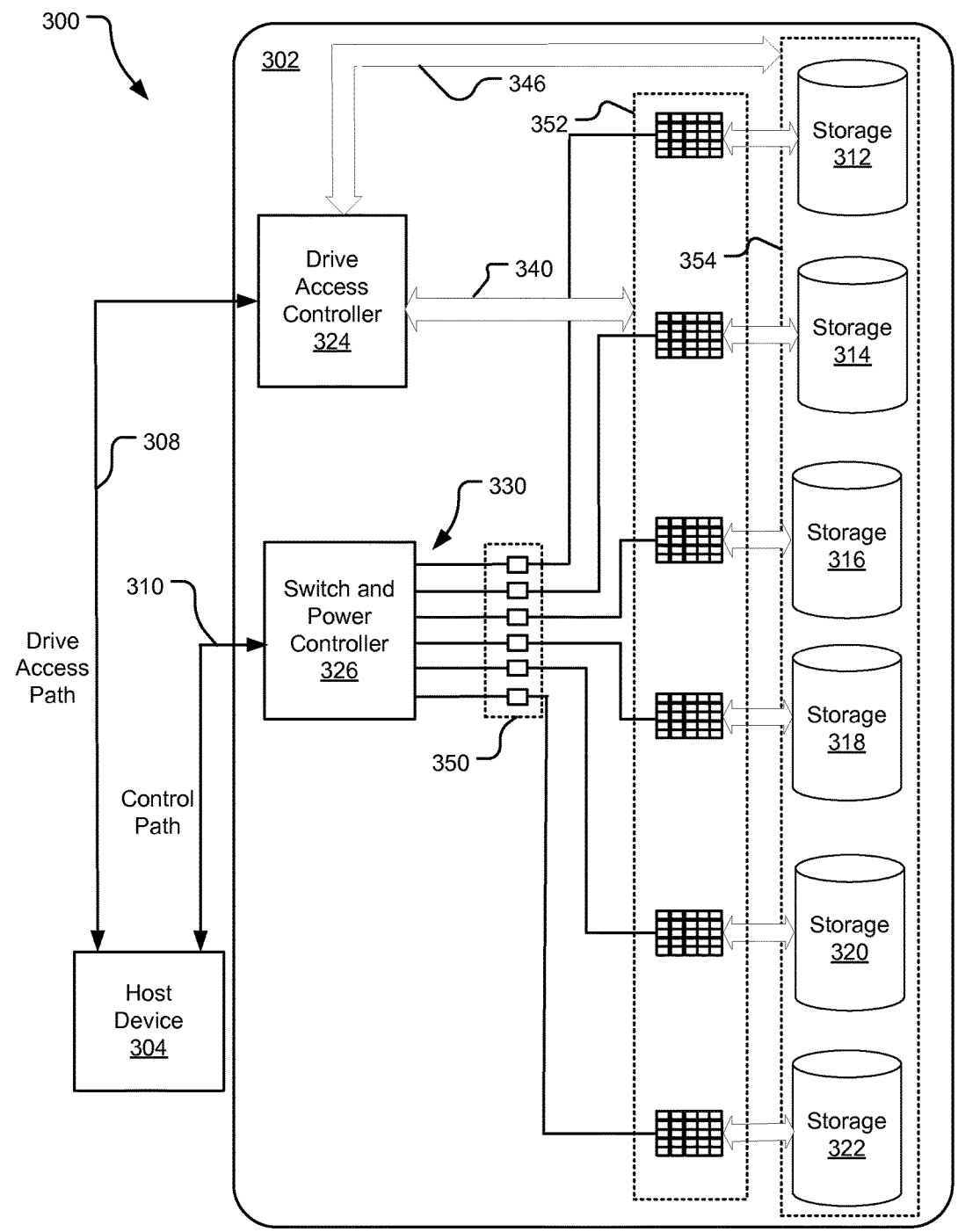
FIG. 3 illustrates another example mass data storage system for independently powering and accessing one or more storage drives with shared control electronics within a media unit.

FIG. 3 illustrates another example data storage system 300 for independently powering and accessing one or more storage drives in an array 354 (including storage drives 312, 314, 316, 318, 320, and 322) within a media unit 302 via shared control electronics including at least a drive access controller 324 and a switch and power controller 326.

The drive access controller 324 communicates with a host device 304 over a drive access path 308, and the switch and power controller 326 communicates with the host device 304 over a control path 310. The drive access path 308 and the control path 310 are separate physical connections which may be the same or different in various implementations. In one implementation, the control path 310 facilitates transport of an out-of-band signal such as I2C, USB, RS-232, etc., while the drive access path 308 facilitates transport of an in-band signal such as SATA, SAS, PCIe, Fibre Channel, Ethernet, etc.

In various implementations, either or both of the drive access controller 324 and the switch and power controller 326 may take the form of one or more PCBAs, peripheral interface controllers (also referred to as programmable interface controllers, programmable intelligent computers, or "PICs"), ASICs and/or SoCs.

Each of the storage drives 312, 314, 316, 318, 320, and 322 in the media unit 302 is communicatively coupled to both the drive access controller 324 and to the switch and power controller 326. The drive access controller 324 generally manages drive access operations across a signal path 346 to selectively read data from or write data to each of the storage drives 312, 314, 316, 318, 320, and 322. In one implementation, the drive access controller 324 includes electronics for selectively sending a high-speed signal (e.g., via a SAS or SATA protocol) to each one of the storage drives 312, 314, 316, 318, 320, and 322.

Outputs 340 of the drive access controller 324 are coupled to an array of field-effect transistors (i.e., an FET bank array 352) including a plurality of switches creating signal paths to each of the storage drives 312, 314, 316, 318, 320, and 322. Various switches included in the FET bank array 352 include, for example, switches to select a preamplifier and configure preamplifier settings, read/write switches to open appropriate read/write channel, switches to control the movement of an actuator to position various read/write heads, and/or switches to spin up or down the voice coil motor (VCM) any select one of the storage drives 312, 314, 316, 318, 320, and 322, etc.

The switch and power controller 326 generally manages control operations for configuration, selection, and power management of the storage drives 312, 314, 316, 318, 320, and 322. In FIG. 3, the switch and power controller 326 is shown connected to an exemplary array of general purpose input/output ports 330 coupled to various transistors 350 further coupled to respective switches within the FET bank array 352. Examples of control operations performed by the switch and power controller 326 include operations for configuring various switches to reset drive electronics when switching from one storage drive to another and changing (e.g., turning on/off) the power flow to any of the individual storage drives 312, 314, 316, 318, 320, and 322 or the drive access controller 324.

In different implementations, the drive access controller 324 and switch and power controller 326 may each include different hardware elements. However, in one example implementation, the switch and power controller 326 includes a PIC controller for communicating via an I2C interface with the host device 304 over the control path 310. The switch and power controller 326 may also include, for example, circuitry for thermal monitoring of the various storage drives, circuitry for performing media surface defect scans, circuitry for motor speed control, and/or circuitry for media certification. In the same or another implementation, the drive access controller 324 includes a serial ATA or SAS adaptor, signal amplifiers and filters, read/write channels, and various security keys.

In preparation for execution of a drive access operation, the host device 304 transmits a drive selection instruction along the control path 310. In one implementation, the host device 304 communicates with the switch and power controller 326 via an I2C protocol that provides an API for controlling a SAS or SATA interface between each of the selectable storage drives 312, 314, 316, 318, 320, and 322 and the drive access controller 324. For example, the host device 304 may specify a data rate of a SATA bus of the drive access controller 324 by sending a command through the control path 310 (e.g., an I2C interface) to the switch and power controller 326. Responsive to receipt of a specified data rate along the control path 310, the switch and power controller 326 sets hardware parameters for the array of selectable storage drives 312, 314, 316, 318, 320, and 322 and the drive access controller 324. A variety of other communication protocols and associated hardware elements could alternatively be implemented to accomplish the same effect.

In one implementation, the host device 304 communicates with the switch and power controller 326 via an API that identifies a target media unit (e.g., the media unit 302); a target drive within the target media unit (e.g., the storage drive 312); and a drive control command for execution on the target drive. A number of switch and power controllers in different media units (e.g., the media unit 302) "listen" to communications across the control path 310 and wait to receive a sequence of data bits including a self-identifying unit ID. Upon detecting the self-identifying ID, the switch and power controller 326 interprets a following sequence of bits, which includes a drive control command and a drive identifier indicating one or more of the storage drives 312, 314, 316, 318, 320, or 322 on which to execute the drive control command.

In one example communication sequence, the host device 304 sends a drive selection instruction to the switch and power controller 326 via the control path 310 to request selection of a target drive for a read or write operation. In response, the switch and power controller 326 initiates a sequence of operations to reconfigure switches in the FET bank array 352 to select the target drive for a drive access operation. If a different storage drive is currently powered and selected by the FET bank array 352, the switch and power controller 326 may power down (e.g., from an on state to an off state) the currently selected drive and also power on the target drive.

Commands of a drive selection instruction implemented by the switch and power controller 326 are essentially "invisible" to the drive access controller 324 in the sense that the drive access controller 324 may be able to observe switch and power configuration alterations exclusively via its own associated nest of connections to the storage drives after such switch and/or power alternations have been implemented.

After sending a drive selection instruction to the switch and power controller 326, the host device 304 postpones transmission and execution of any related drive access commands (e.g., the read or write commands) until receiving confirmation that the drive selection instruction was successfully executed. To verify whether or not the drive selection instruction was successfully executed, the host device 304 may retrieve information about the current state of the storage drives in the media unit 302 over either the control path 310 or the drive access path 308.

For example, the host device 304 may retrieve information about the power and switch configuration of the FET bank array 352 by polling the switch and power controller 326 over the control path 310. Additionally, the host device 304 may wait for confirmation of successful execution of a drive selection operation via the drive access path 308. For example, the switch and power controller 326 may, when implementing the drive access instruction, re-start an interface connection of the drive access path 308 and the host device 304. In this case, the host device 304 confirms the successful selection of a target storage drive when it "sees" the drive access controller 324 following the restart. Responsive to the feedback over the control path 310 and/or the drive access path 308, the host device 304 transmits one or more drive access commands over the drive access path 308, and the drive access controller 324 executes the drive access commands.

Figure 4:
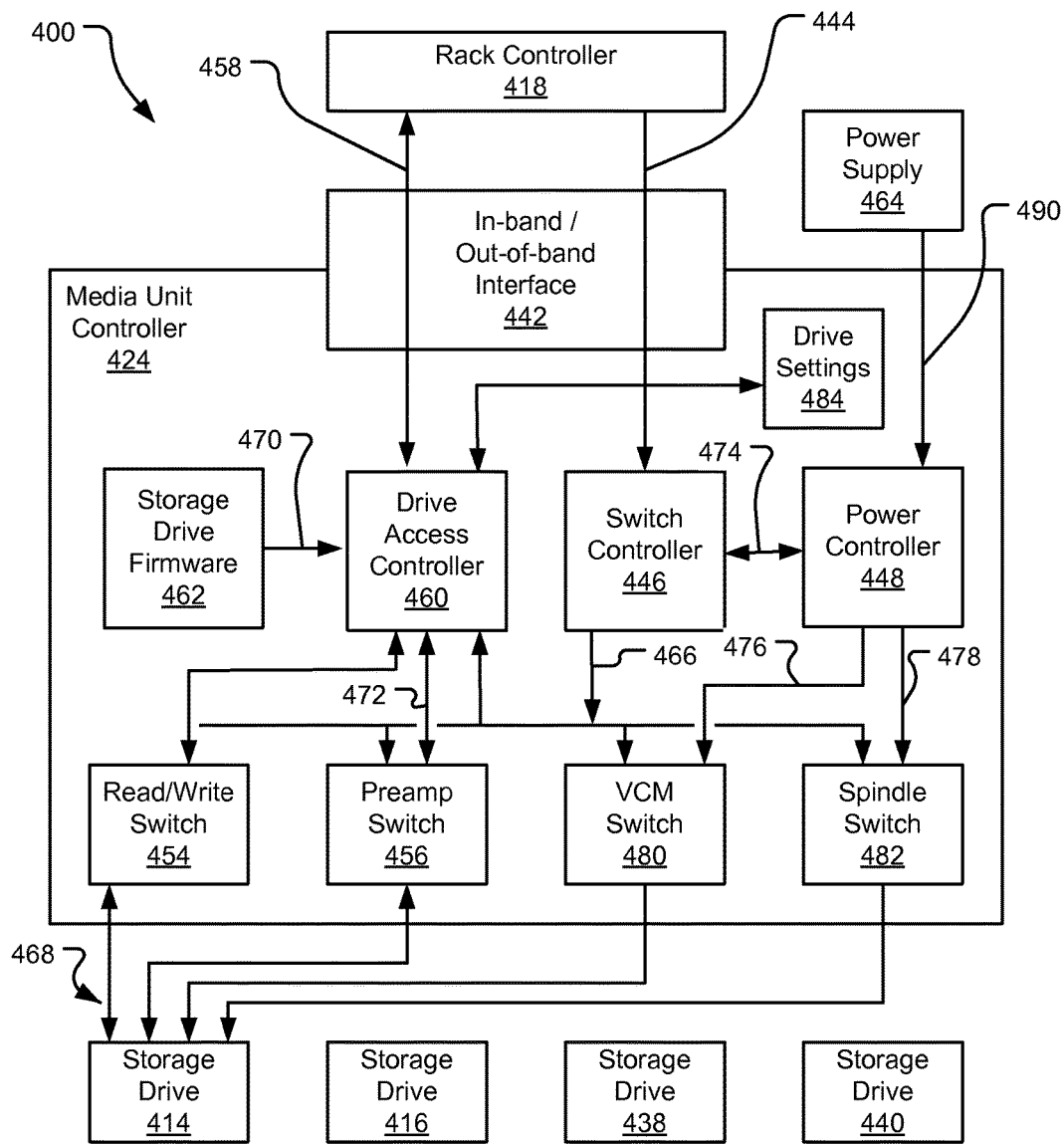
FIG. 4 illustrates an example media unit controller selectively operating one of an array of connected storage drives using instructions from a rack controller.

FIG. 4 illustrates an example media unit controller 400 selectively operating one of an array of connected storage drives 414, 416, 438, 440 using instructions from a rack controller 418. The rack controller 418 receives and orchestrates read/write requests within a corresponding rack of a mass data storage system (see e.g., racks 102, 104 of mass data storage system 100 of FIG. 1). The media unit controller 424 may take the form of one or more PCBAs, PICs, ASICs, and/or SOCs, for example.

In response to a read request, the rack controller 418 determines if the requested data is located within its associated rack and if so, where the requested data is specifically located. The specific location is defined at an address level on one or more storage drives within the rack. The rack controller 418 communicates with a media unit controller (e.g., media unit controller 424) to read the requested data from the storage drive(s) within the rack that contain the requested data via an in-band/out-of-band interface 442.

More specifically, the rack controller 418 sends an out-of-band signal 444 (e.g., (I2C, USB, RS-232, etc.) to a switch controller 446 (e.g., a PIC) that identifies which storage drive(s) contains the requested data. The out-of-band signal 444 is sent separately from the data signal itself (see in-band signal 458 discussed below). The switch controller 446 is connected to an array of switches 454, 456, 480, 482 that selectively connect components of the media unit controller 424 to the connected storage drives 414, 416, 438, 440. The switch controller 446 instructs the individual switches to select a desired drive (see arrows 466). In FIG. 4, switches 454, 456, 480, 482 illustrate a connection between the media unit controller 424 and the storage drive 414 (see arrows 468). The switches 454, 456, 480, 482 are capable of selectively making an active connection to any one of the connected storage drives 414, 416, 438, 440 (here, storage drive 414).

Further, the switch controller 446 instructs power controller 448 to provide power to the active storage drive 414 (see arrow 474). The power controller 448 shunts power from a power supply 464 (see arrow 490) through voice coil motor switch 480 (e.g., a field-effect transistor ("FET")) (see arrow 476) and a spindle switch 482 (e.g., also a FET) (see arrow 478). Together, the switch controller 446 and power controller 448 may perform some or all of the functionality described above with respect to the switch and power controller 326 of FIG. 3. In other implementations, the power controller 448 may provide power to other components of the active storage drive 414 via additional switches.

Feedback from the active storage drive 414 may be received via the power controller 448 (e.g., confirmation of a successful power up of the storage drive 414), and this information may also be conveyed back to the switch controller 446 to confirm the selection of the storage drive 414. In additional, this feedback is further conveyed to the drive access controller 460 to inform the drive access controller 460 that the storage drive 414 is ready for a read or write operation.

Simultaneously or subsequent to the switch controller 446 selecting the storage drive(s) that contain the requested data, the rack controller 418 sends an in-band signal 458 (e.g., SATA, SAS, PCIe, Fibre Channel, Ethernet, etc.) that contains a data signal (e.g., in a file format, an object format, or a block format) combined with metadata and/or data control information to the drive access controller 460. In one implementation, the rack controller 418 sends the in-band signal 458 responsive to confirmation that a particular target storage drive has been selected (e.g., confirmation that the active storage drive 414 is powered on and that the corresponding switches are engaged). For example, the rack controller 418 may periodically request configuration and power state information from the switch controller 446 and wait to send the in-band signal 458 until confirming the drive selection. In another implementation, the rack controller 418 transmits the in-band signal 458 in response to observing a successful "restart" of the connection along via the in-band signal 458, which occurs when the switch controller 446 successfully switches a current storage drive selection.

The drive access controller 460 controls read/write operations on the individual storage drives 414, 416, 438, 440 connected to the media unit controller 424 based on the data, metadata, and/or control information within the in-band signal 458. Responsive to receipt of the in-band signal 458, the drive access controller 460 accesses storage drive firmware 462 (e.g., dynamic random access memory ("DRAM")) to retrieve operating protocols on the active storage drive 414, as illustrated by arrow 470.

More specifically, the drive access controller 460 sends a preamp (or preamplifier) control signal via a serial interface or other command connection through preamp switch or preamplifier switch 456 (e.g., a multiplexer switch or MUX) to operate storage drive 414 (see arrow 472). The requested data is then read from the active storage drive 414 via a read/write switch or data access switch 454 (e.g., a radio frequency or microwave switch) back to the drive access controller 460, which sends the read data back to the rack controller 418 via the in-band/out-of-band interface 442 for transmission outbound from the mass data storage system.

Data read from the storage drive 414 and data written to the storage drive 414 is transmitted in the form of an analog signal between the drive access controller 460 and the storage drive 414 through the preamp switch 456. The read/write signal may be finely tuned to compensate for noise introduced by the preamp switch 456 and adjacent equipment between the drive access controller 460 and the storage drive 414. In some implementations, the preamp switch 456 is a radio frequency or microwave switch that minimizes such interference and the connections between the drive access controller 460 and the storage drive 414 are shielded to reduce/prevent noise from interfering with the read/write signal. Further, in some implementations, the preamp switch 456 is the same as or similar to a head switch used within a storage drive containing multiple heads.

In various implementations, the storage drives 414, 416, 438, 440 each have disparate performance characteristics, operating conditions, and/or configuration data. As a result, drive settings may be updated at the drive access controller 460 to ensure that data is properly written to the active storage drive 414. In one implementation, the drive access controller 460 is connected to a drive settings database 484 (e.g., electrically erasable programmable read-only memory ("EPROM")) and pulls configuration data (e.g., in the form of a configuration table) from the drives settings database 484 specific to the active storage drive 414. In some implementations, the drive access controller 460 consults the drive settings database 484 every time the media unit controller 424 performs a new power up operation.

In another implementation, the performance characteristics, operating conditions, and/or configuration data of the individual storage drives are stored on the storage drives themselves. One or more discrete locations on the connected storage drives is reserved for storing this information. The first operation once a power up operation is performed is to read these discrete location(s) to discover the configuration data of the active storage drive by performing a read operation on the reserved location(s) of the active storage drive (e.g., read a configuration file). The drive access controller 460 uses the read configuration data for future read/write operations on the active storage drive. In some implementations, the configuration data is stored in multiple predetermined locations to ensure data redundancy and reliability.

In various implementations, the functions of the switch controller 446, the drive access controller 460, and the power controller 448 are performed simultaneously or sequentially. Further, some functions of the media unit controller 424 may be contingent on success of a prior function (e.g., sending a read/write signal to a selected storage drive is contingent on receipt of confirmation that the selected storage drive was successfully powered up).

In response to a write request, the rack controller 418 determines where the data is to be written within the rack. The location is defined at an address level on one or more storage drives within the rack. The rack controller 418 communicates with the media unit controller 424 to write the data to the selected storage drive(s) via the in-band/out-of-band interface 442.

More specifically, the rack controller 418 sends an out-of-band signal 444 to the switch controller 446 that contains instructions on which storage drive(s) are to be selected for writing the incoming data. The switch controller 446 instructs the individual switches to select a desired drive (e.g., storage drive 414) and the storage drive selection is also fed back to the drive access controller 460.

Simultaneously or subsequently to the switch controller 446 selecting the storage drive(s) for writing the incoming data, the rack controller 418 sends an in-band signal 458 that contains a data signal to the drive access controller 460. In one implementation, the rack controller 418 sends the in-band signal 458 responsive to confirmation from the switch controller 446 and/or the drive access controller 460 that a particular target storage drive is powered on and that the corresponding switches are engaged.

The drive access controller 460 utilizes storage drive firmware 462 to perform the requested write operation on the active storage drive (e.g., storage drive 414). More specifically, the drive access controller 460 sends a preamp control signal to operate the storage drive 414. The incoming data is then written to the active storage drive 414 via the read/write switch 454. The drive access controller 460 communicates a successful write operation on the active storage drive 414 back to the rack controller 418, which may in turn communicate the successful write operation to the source of the incoming data.

In one implementation, the media unit controller 424 contains a majority, if not all of the control hardware that would normally be included in a typical storage drive. As a result, the media unit controller 424 can be shared among the connected storage drives 414, 416, 438, 440 reducing the unit cost of the individual storage drives. Further, the media unit controller 424 may incorporate some or all of the components and/or functionality of the rack controller 418. As a result, the rack controller 418 may be omitted and the media unit controller 424 may communicate directly with other media units within the rack and the mass data storage system overall. Further still, the rack controller 418 may incorporate some or all of the components and/or functionality of the media unit controller 424.

In another implementation, the rack controller 418 communicates with the drive access controller 460 using a communication protocol that combines the in-band signal 458 and the out-of-band signal 444. The drive access controller 460 separates the combined signal and sends the out-of-band portion 444 to the switch controller 446 and processes the in-band portion 458 as described in detail above.

Aspects of the media unit controller 424 may be implemented in a tangible computer-readable storage media readable by a computing node within or communicatively coupled to the mass data storage system. The term "tangible computer-readable storage media" includes, but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device or computer. In contrast to tangible computer-readable storage media, intangible computer-readable communication signals may embody computer readable instructions, data structures, program modules, or other data resident in a modulated data signal, such as a carrier wave or other signal transport mechanism.

Figure 5:
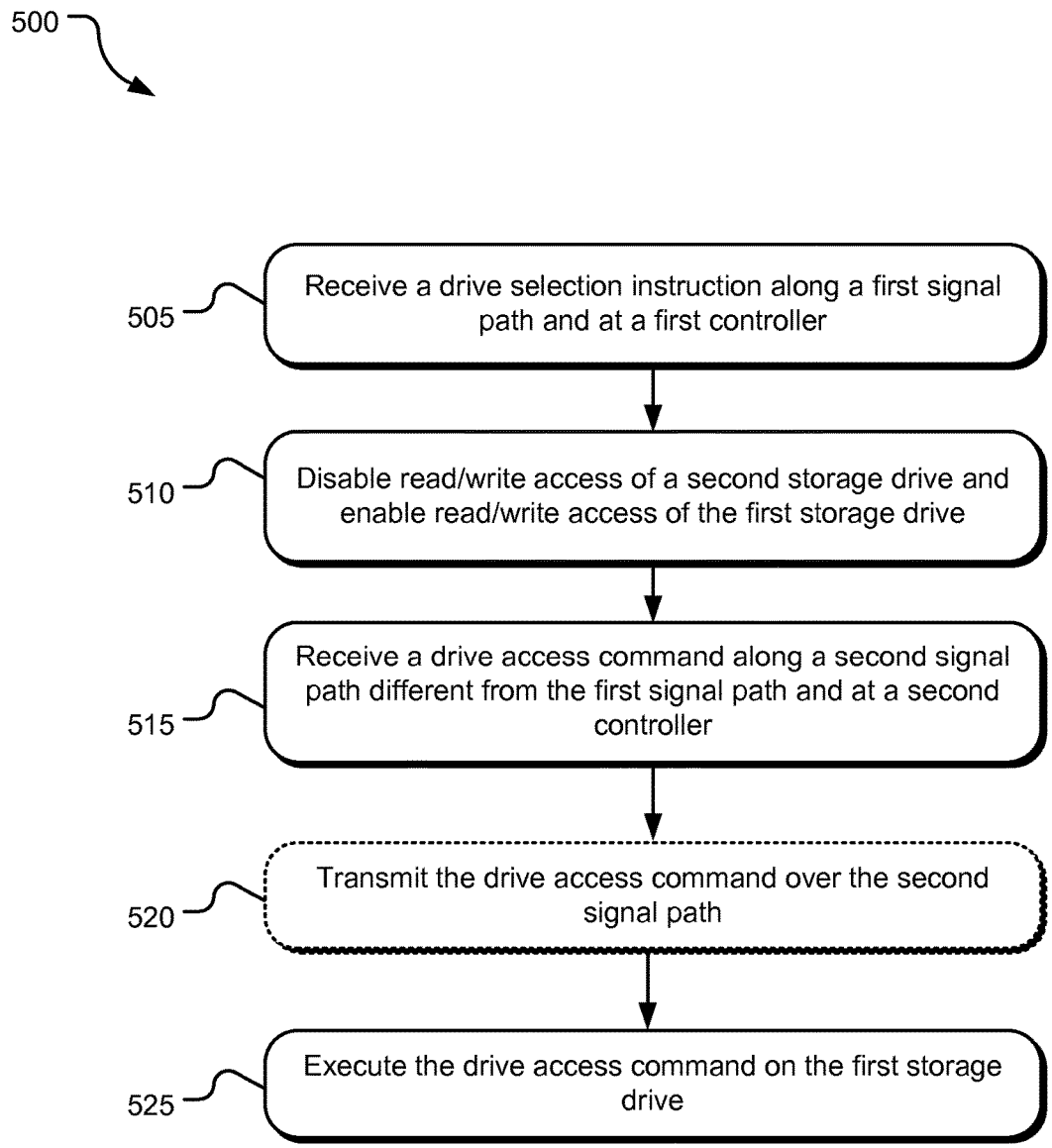
FIG. 5 illustrates example operations for performing data access operations on one of an array of connected storage drives using instructions from shared control electronics within a mass data storage system.

FIG. 5 illustrates example operations 500 for performing data access operations on one of an array of connected storage drives using instructions from shared control electronics within a mass data storage system. The shared control electronics are configured to independently select and power each of the connected storage drives. According to one implementation, the shared control electronics include at least two different controllers that are each coupled to a host device via independent, non-overlapping signal paths.

A receiving operation 505 receives a drive selection instruction along a first signal path. The drive selection instruction instructs a first controller to select a first storage drive from the array of connected drives. Responsive to receipt of the drive selection instruction, a reconfiguring operation 510 reconfigures the shared electronics to disable read/write access of a second storage drive of the connected storage drives and to enable read/write access of the first storage drive.

In response to the reconfiguring of the shared control electronics, a receiving operation 515 receives a drive access command along a second signal path different from the first signal path. The drive access command instructs a second controller to execute a read or write command on the first storage drive. In one implementation, the drive access command is sent from a host device responsive to feedback from the first controller and/or the second controller indicating successful execution of the drive selection operation. Communications sent and received along the first signal path may utilize a communication protocol that sets the operating syntax for a bus in the second controller that receives communications along the second signal path. For example, the communication protocol of the first signal path may determine what devices appear on the bus coupled to the second controller and provide an API for an interface with the second signal path. A transmission operation 520 transmits the drive access command by sending data to or requesting data from the second controller over the second signal path. An execution operation 525 executes the drive access command on the first storage drive.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
    multiple selectable storage drives in an enclosure communicatively coupled to shared control electronics, the shared control electronics including a first controller for selecting a storage drive of the multiple selectable storage drives for execution of a drive access command and a second controller for executing the drive access command on the selected storage drive;
    a first signal path for transmitting a drive selection instruction from a host external to the enclosure to the first controller, the drive selection instruction identifying the selected storage drive and including at least one drive control command for execution on the selected storage drive; and
    a second signal path for transmitting the drive access command from the host to the second controller, the second signal path different from the first signal path.

2. The system of claim 1, wherein the drive access command is transmitted along the second signal path responsive to feedback received along the first signal path indicating successful execution of the drive selection instruction.

3. The system of claim 2, wherein the drive access command is transmitted along the second signal path further responsive to a reset detected along the second signal path.

4. The system of claim 1, where the first controller selects the storage drive by powering on the at least one selected storage drive from an off state to an on state.

5. The system of claim 1, wherein the first controller selects the storage drive along the first signal path and the first signal path by-passes the second controller.

6. The system of claim 1, wherein a host device transmits a signal to the first controller along the first signal path via an application programming interface (API) and the signal sets an operating syntax for an interface of the second controller and each of the multiple selectable storage drives.

7. The system of claim 1, wherein the first controller selects the storage drive by powering down at least one other of the multiple selectable storage drives.

8. The system of claim 1, wherein the first controller and the second controller are each independently coupled to each one of the multiple selectable storage drives.

9. The system of claim 1, wherein the drive selection instruction is of an I2C protocol.

10. A method comprising:
    receiving along a first signal path and at a first controller a drive selection instruction transmitted by a host external to an enclosure including multiple selectable storage drives with shared control electronics, the drive selection instruction identifying a selected storage drive from the multiple selectable storage drives and including a drive control command for executing on the selected storage drive;
    responsive to receipt of the drive selection instruction, reconfiguring the shared control electronics to disable data access to another storage drive and enable data access to the selected storage drive;
    receiving, at a second controller, a drive access command transmitted by the host over a second signal path different from the first signal path and in response to the reconfiguring of the shared control electronics; and
    executing the drive access command on the selected storage drive.

11. The method of claim 10, wherein reconfiguring the shared control electronics further comprises reconfiguring the shared control electronics to disable drive access to at least one other of the multiple selectable storage drives.

12. The method of claim 10, further comprising:
    transmitting the drive access command to the second controller responsive to feedback received along the first signal path.

13. The method of claim 10, further comprising:
    transmitting the drive access command to the second controller responsive to a reset detected along the second signal path.

14. The method of claim 10, wherein the first signal path by-passes the second controller.

15. The method of claim 10, wherein the drive selection instruction is transmitted via an inter-integrated circuit (I2C) protocol.

16. The method of claim 10, wherein a protocol of the drive selection instruction implemented by an application programming interface of the first controller sets an operating syntax for an interface of the second controller and each of the multiple selectable storage drives.

17. The method of claim 10, wherein the first controller and the second controller are each independently coupled to each one of the multiple selectable storage drives.

18. A system comprising:

a drive access controller configured to receive and execute a drive access command transmitted by an external host over a first signal path;

a power controller configured to receive and execute a drive selection instruction of an I2C protocol from the external host over a second signal path different from the first signal path, the drive selection instruction including:

a first identifier for selecting one of multiple selectable enclosures that each further include multiple selectable storage drives coupled to shared control electronics;

a second identifier selecting one of the selectable storage drives in the selected enclosure; and a drive control command for executing on the selected storage drive in the selected enclosure.

19. The system of claim 18, wherein the drive control command instructs the shared electronics to power on the selected storage drive from an off state to an on state independent of other storage drives in the selected enclosure.

20. The system of claim 18, wherein the shared electronics are configured to selectively power any of the multiple selectable storage drives in the selected enclosure.

* * * * *